US012774847B2

(12) United States Patent
Currey et al.

(10) Patent No.: US 12,774,847 B2
(45) Date of Patent: Oct. 27, 2026

(54) RESERVOIR FLUID COUPLING

(71) Applicant: Mercury Plastics LLC, Middlefield, OH (US)

(72) Inventors: Donald Currey, Chagrin Falls, OH (US); Scott Raymond Gardner, Chagrin Falls, OH (US); Grandin Rushlander, Mantua, OH (US); Earl Christian, Jr., Chagrin Falls, OH (US)

(73) Assignee: Mercuury Plastics LLC, Middlefield, OH (US)

( * ) Notice: Subject to any disclaimer, the term of this patent is extended or adjusted under 35 U.S.C. 154(b) by 132 days.

(21) Appl. No.: 18/771,820

(22) Filed: Jul. 12, 2024

(65) Prior Publication Data

US 2025/0020395 A1 Jan. 16, 2025

Related U.S. Application Data

(60) Provisional application No. 63/526,558, filed on Jul. 13, 2023.

(51) Int. Cl.

| | |
|---|---|
| ***F25D 23/12*** | (2006.01) |
| ***B67D 7/02*** | (2010.01) |
| ***F16L 37/248*** | (2006.01) |
| ***F16L 41/02*** | (2006.01) |
| *B67D 1/08* | (2006.01) |

(52) U.S. Cl.

CPC ......... *F25D 23/126* (2013.01); *B67D 7/0288* (2013.01); *F16L 37/248* (2013.01); *F16L 41/021* (2013.01); *B67D 2001/0812* (2013.01); *B67D 2210/00036* (2013.01); *B67D 2210/0006* (2013.01); *B67D 2210/00062* (2013.01); *F25D 2323/122* (2013.01)

(58) Field of Classification Search

None

See application file for complete search history.

(56) References Cited

U.S. PATENT DOCUMENTS

| | | | | |
|---|---|---|---|---|
| 2,676,743 A * | 4/1954 | Babson | B67C 3/30 | 141/35 |
| 2,684,942 A * | 7/1954 | Tice | B01J 47/012 | 210/253 |
| 2,731,027 A | 1/1956 | Daun | | |
| 2,788,642 A * | 4/1957 | Burkhead | F25D 23/126 | 137/574 |
| 3,511,415 A * | 5/1970 | Crowe | F25D 23/126 | 222/146.1 |
| 3,538,950 A * | 11/1970 | Porteners | F16L 37/252 | 285/376 |
| 3,640,552 A * | 2/1972 | Demler, Sr. | F16L 39/02 | 285/124.5 |
| 3,722,538 A | 3/1973 | Gezari | | |
| 3,834,178 A * | 9/1974 | Pink | F25D 23/126 | 62/338 |

(Continued)

FOREIGN PATENT DOCUMENTS

| | | |
|---|---|---|
| CN | 101885244 | 11/2010 |
| CN | 201651578 | 11/2010 |
| JP | 2004082725 | 3/2004 |

*Primary Examiner* — Matthew W Jellett

(74) *Attorney, Agent, or Firm* — Bose McKinney & Evans LLP

(57) ABSTRACT

A fluid coupling for use with a reservoir of a water distribution system, such as a ganged reservoir system.

33 Claims, 10 Drawing Sheets

(56) References Cited

U.S. PATENT DOCUMENTS

| | | | | | |
|---|---|---|---|---|---|
| 3,982,406 | A * | 9/1976 | Hanson | F25D 23/126 | 62/396 |
| 4,739,629 | A * | 4/1988 | True | F25D 23/126 | 165/81 |
| 5,090,440 | A * | 2/1992 | Ladouceur | B67D 1/07 | 137/240 |
| 5,315,845 | A * | 5/1994 | Lee | B67D 1/0858 | 165/172 |
| 5,433,348 | A * | 7/1995 | Deering | B67D 1/0867 | 222/129.1 |
| 5,447,341 | A * | 9/1995 | Hartel | B29C 45/14377 | 285/285.1 |
| 5,542,264 | A * | 8/1996 | Hortin | B67D 1/0858 | 137/236.1 |
| 6,079,221 | A * | 6/2000 | Senner | F25D 23/126 | 62/338 |
| 6,250,688 | B1 * | 6/2001 | Kirby | F16L 37/113 | 285/911 |
| 6,305,724 | B1 * | 10/2001 | Sampson | F16L 37/36 | 285/361 |
| 6,325,425 | B1 * | 12/2001 | Kierath | F16L 37/113 | 285/361 |
| 6,607,105 | B2 * | 8/2003 | Phelps | B67D 1/0406 | 137/614.04 |
| 6,935,532 | B2 * | 8/2005 | Tinucci | B67D 1/1245 | 222/129.4 |
| 7,464,969 | B2 * | 12/2008 | Poll | F16L 55/1155 | 285/361 |
| 7,850,898 | B1 | 12/2010 | Rowley et al. | | |
| 8,431,067 | B2 * | 4/2013 | Rowley | B29C 49/4252 | 264/516 |
| 8,789,854 | B2 * | 7/2014 | Christian, Jr. | F16L 37/127 | 285/39 |
| 8,980,161 | B2 * | 3/2015 | Rowley | B29C 49/04 | 264/516 |
| 9,096,002 | B2 * | 8/2015 | Seman, Sr. | B29C 45/14065 | |
| 9,297,575 | B1 * | 3/2016 | Gardner | F25D 31/002 | |
| 9,371,947 | B2 * | 6/2016 | Choi | F16L 37/0927 | |
| 9,657,879 | B1 * | 5/2017 | Currey | F25D 1/00 | |
| 9,878,892 | B2 * | 1/2018 | Jersey | B67D 1/1272 | |
| 10,422,574 | B1 * | 9/2019 | Gardner | F25D 23/126 | |
| 10,436,354 | B1 * | 10/2019 | Currey | F16L 33/34 | |
| 10,486,955 | B1 * | 11/2019 | Griego | B67D 1/0406 | |
| 10,591,103 | B1 * | 3/2020 | Gardner | F16L 19/0231 | |
| 10,760,716 | B1 | 9/2020 | Currey et al. | | |
| 10,889,064 | B1 * | 1/2021 | Currey | B23K 26/206 | |
| 11,008,211 | B2 * | 5/2021 | Robinson | C11D 13/08 | |
| 11,034,487 | B1 * | 6/2021 | Gardner | B65D 1/0246 | |
| 11,358,851 | B1 | 6/2022 | Gardner et al. | | |
| 11,460,137 | B2 * | 10/2022 | Vinson | F16L 37/252 | |
| 2004/0178629 | A1 * | 9/2004 | Yoshida | F16L 37/0885 | 285/305 |
| 2009/0029609 | A1 * | 1/2009 | Breece | B63H 21/14 | 137/625.46 |
| 2013/0009396 | A1 * | 1/2013 | Larsson | F16L 3/02 | 285/402 |
| 2014/0109526 | A1 * | 4/2014 | Taylor | B67D 3/0064 | 215/307 |
| 2014/0230481 | A1 | 8/2014 | Yun et al. | | |
| 2015/0210523 | A1 | 7/2015 | Witte et al. | | |
| 2022/0333723 | A1 | 10/2022 | Gardner et al. | | |
| 2025/0305612 | A1 * | 10/2025 | Pedersen | F16L 37/252 | |

* cited by examiner

RESERVOIR FLUID COUPLING

CROSS-REFERENCE TO RELATED APPLICATION

The present application claims priority to U.S. Provisional Patent Application Ser. No. 63/526,558, filed Jul. 13, 2023, the disclosure of which is expressly incorporated herein by reference.

BACKGROUND AND SUMMARY OF THE DISCLOSURE

The present invention relates generally to water distribution systems and, more particularly, to a fluid coupling for use with reservoirs in such water distribution systems.

It is known to provide dispensers within refrigerators (or other appliances) in order to enhance user accessibility to ice and/or water. Typically, a water line is connected to the refrigerator in order to supply needed water for operation of the dispenser. Such dispensers often include a water tank within a fresh food compartment of the refrigerator to act as a reservoir such that a certain quantity of water can be chilled prior to being dispensed.

Conventional water tanks for appliance dispensers may be formed from a variety of known processes, such as blow molding of a polymer. An illustrative process is detailed in U.S. Pat. No. 7,850,898 to Rowley et al., the disclosure of which is expressly incorporated herein by reference, in which a heated extrudate is positioned in a mold followed by insertion of previously extrudated profiles a main body of the extrudate. The mold is closed and pressure applied through the inserted profiles to expand the main body of the extrudate to fill the mold cavity.

Various coupling arrangements are known for interconnecting water tanks and providing fluid connections to other fluid components in conventional water distribution systems. For example, an illustrative coupling system for a ganged reservoir system is shown in U.S. Pat. No. 11,358,851 to Gardner et al., the disclosure of which is expressly incorporated herein by reference.

As shown in FIG. 1, a known reservoir system or assembly 10 illustratively includes a molded tank 12 formed of a polymer. Tubes 14 and 16, also illustratively formed of a polymer, are operably coupled to opposing ends 18 and 20 of the tank 12. Overmolds 22*a*, 22*b* and 24*a*, 24*b* are illustratively formed on opposing proximal and distal ends 26*a*, 26*b* and 28*a*, 28*b* of the tubes 14 and 16, respectively.

More particularly, overmolds 22*a*, 22*b* on the proximal ends 26*a*, 26*b* of the tubes 14 and 16 are illustratively formed of a polymer and become chemically/heat bonded to the tank during forming of the tank 12. As such, the overmolds 22*a*, 22*b* couple the tubes 14 and 16 to the tank 12. Overmolds 24*a*, 24*b* fluidly couple distal ends 28*a*, 28*b* of the tubes 14 and 16 to a valve or other part of the reservoir system 10. The overmolds 24*a*, 24*b* are illustratively formed of a polymer and typically require "full crosslinking". The tank 12 itself may be formed of a polymer that only requires "partial crosslinking".

For tubes 14 and 16 that include overmolds 22*a*, 22*b* and 24*a*, 24*b*, it is typically required to fully crosslink the tube 14, 16 and the respective overmolds 24*a*, 24*b*, while shielding/blocking the tube 14, 16 and/or the respective overmolds 22*a*, 22*b*. The tubes 14, 16 and respective overmolds 22*a*, 22*b* are shielded so that a user can insert overmold 22*a*, 22*b*, or tube 14, 16, into the extrudate as the tank 12 is formed. Bonding between the tank 12 and the tube 14, 16 and overmolds 22*a*, 22*b* needs to take place before crosslinking occurs to ensure a chemical/heat bond. Then the completed assembly 10 (tank 12, tubes 14, 16, and overmolds 22, 24) may be crosslinked as a system to facilitate crosslinking of the tank 12.

The requirement of a leak free connection/bond/joint at the interface of overmold 22*a*, 22*b* to the tank 12 dictates the above-noted shielding. As apparent, this makes the crosslinking process more difficult and requires additional tooling and slower processing of the reservoir system 10. This results in overmolds 22*a*, 22*b* and 24*a*, 24*b* and tubes 14 and 16 receiving some crosslinking twice (before bonding to the tank 12, and then again with the tank 12).

As such, there remains a need for an efficient and cost effective fluid coupler, and related method of forming same, for a reservoir system.

According to an illustrative embodiment of the present disclosure, a reservoir system includes a first container portion having a first side wall with a first neck defining a first opening, and second container portion including a second side wall with a second neck defining a second opening. A first fitting includes a longitudinally extending first barbed projection received within the first opening of the first container portion, and a transversely extending male connector in fluid communication with the first barbed projection. A first tube includes a proximal end and a distal end, the first tube being fluidly coupled to the first fitting. A first overmold secures the proximal end of the first tube to the first fitting. A second fitting includes a longitudinally extending second barbed projection received within the second opening of the second container portion, and a transversely extending female connector in fluid communication with the second barbed projection. The male connector is received within the female connector to fluidly couple the first fitting with the second fitting. A second tube includes a proximal end and a distal end, the second end being fluidly coupled to the second fitting. A second overmold secures the proximal end of the second tube to the second fitting.

According to another illustrative embodiment of the present disclosure, a reservoir system includes a first container portion having a first side wall with a first neck defining a first opening, and second container portion having a second side wall with a second neck defining a second opening. A first fitting includes a longitudinally extending lower projection received within the first opening of the first container portion, a longitudinally extending upper projection in fluid communication with the lower projection, and a transversely extending male connector in fluid communication with the lower projection and the upper projection. A first tube includes a proximal end and a distal end, the first tube being fluidly coupled to the first fitting. A first overmold secures the proximal end of the first tube to the upper projection of the first fitting. A second fitting includes a longitudinally extending lower projection received within the second opening of the second container portion, a longitudinally extending upper projection in fluid communication with the lower projection, and a transversely extending female connector in fluid communication with the lower projection and the upper projection. The male connector is received within the female connector to fluidly couple the first fitting with the second fitting. A second tube includes a proximal end and a distal end, the second tube being fluidly coupled to the second fitting. A second overmold secures the proximal end of the second tube to the upper projection of the second fitting. A releasable retainer extends between the male connector and the female connector.

According to a further illustrative embodiment of the present disclosure, a fluid coupling for a reservoir system includes a first fitting including a longitudinally extending lower projection, a longitudinally extending upper projection, and a transversely extending male connector in fluid communication with the lower projection and the upper projection. The lower projection of the first fitting is a tubular projection including outwardly extending barbs. A second fitting includes a longitudinally extending lower projection, a longitudinally extending upper projection, and a transversely extending female connector in fluid communication with the lower projection and the upper projection. The male connector is received within the female connector to fluidly couple the first fitting with the second fitting. The lower projection of the second fitting is a tubular projection including outwardly extending barbs. A releasable retainer extends between the male connector and the female connector.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

A detailed description of the drawings particularly refers to the accompanying figures, in which.

DETAILED DESCRIPTION OF THE DRAWINGS

Figure 1:
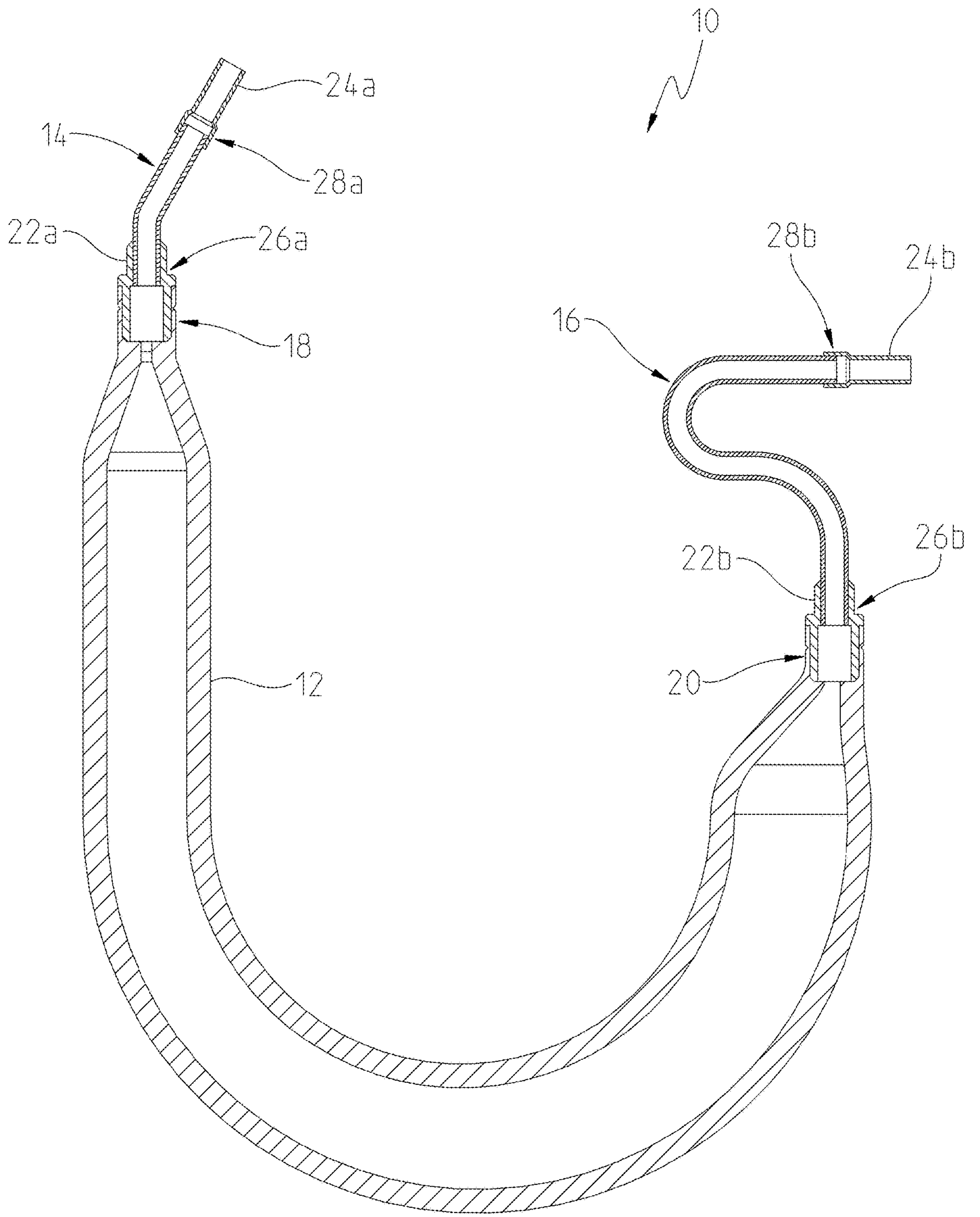
Fig. 1 Prior Art
FIG. 1 is a cross-sectional view of a prior art reservoir system.

The embodiments of the invention described herein are not intended to be exhaustive or to limit the invention to the precise form disclosed. Rather, the embodiments selected for description have been chosen to enable one skilled in the art to practice the invention.

As used herein, the term "overmold" means the process of injection molding a second polymer over a first polymer, wherein the first and second polymers may or may not be the same. An overmold having a specific geometry may be necessary to attach a tube to a fitting, a valve, another tube, a diverter, a manifold, a fixture, a T connector, a Y connector or other plumbing or appliance connection. In one illustrative embodiment, the composition of the second (e.g., overmolded) polymer will be such that it will be capable of at least some melt fusion with the composition of the first polymer (e.g., the polymeric tube or fitting). There are several means by which this may be affected. One of the simplest procedures is to insure that at least a component of the first polymer and that of the second polymer is the same. Alternatively, it would be possible to ensure that at least a portion of the polymer composition of the first polymer and that of the second polymer is sufficiently similar or compatible so as to permit the melt fusion or blending or alloying to occur at least in the interfacial region between the exterior of the first polymer fitting and the interior region of the second polymer. Another manner in which to state this would be to indicate that at least a portion of the polymer compositions of the first polymer and the second polymer are miscible. In contrast, the chemical composition of the polymers may be relatively incompatible, thereby not resulting in a material-to-material bond after the injection overmolding process.

In some examples, the reservoir, or any of the components defined herein, may be made from high density polyethylene which is crosslinked, although the process described herein can be used with tubes or fittings made from any crosslinked polymers. Such polymers may include, but are not limited to, nylon, EVA, PVC, metallocine, polypropylene, polyethylene, silicone, rubber and EPDM. Crosslinked polyethylene, also known as PEX, contains crosslinked bonds in the polymer structure changing the thermoplastic into a thermoset. Crosslinking may be accomplished during or after extrusion depending on the method of crosslinking. The required degree of crosslinking for crosslinking polyethylene tubing, according to ASTM Standard F 876, is between 65-89%. However, the present process contemplates that certain components may be partially crosslinked. In one illustrative example, such components may only be crosslinked to 40%. There are three classifications of PEX, referred to as PEX-A. PEX-B, and PEX-C. PEX-A is made by peroxide (Engel) method. In the PEX-A method, peroxide blending with the polymer performs crosslinking above the crystal melting temperature. The polymer is typically kept at high temperature and pressure for long periods of time during the extrusion process. PEX-B is formed by the silane method, also referred to as the "moisture cure" method. In the PEX-B method, silane blended with the polymer induces crosslinking during secondary post-extrusion processes, producing crosslinks between a crosslinking agent. The process is accelerated with heat and moisture. The crosslinked bonds are formed through silanol condensation between two grafted vinyltrimethoxysilane units. PEX-C is produced by application of an electron beam using high energy electrons to split the carbon-hydrogen bonds and facilitate crosslinking.

Crosslinking imparts shape memory properties to polymers. Shape memory materials have the ability to return from a deformed state (e.g. temporary shape) to their original crosslinked shape (e.g. permanent shape), typically induced by an external stimulus or trigger, such as a temperature change. Alternatively or in addition to temperature, shape memory effects can be triggered by an electric field, magnetic field, light, or a change in pH, or even the passage of time. Shape memory polymers include thermoplastic and thermoset (covalently crosslinked) polymeric materials.

Shape memory materials are stimuli-responsive materials. They have the capability of changing their shape upon application of an external stimulus. A change in shape caused by a change in temperature is typically called a thermally induced shape memory effect. The procedure for using shape memory typically involves conventionally processing a polymer to receive its permanent shape, such as by molding the polymer in a desired shape and crosslinking the polymer defining its permanent crosslinked shape. Afterward, the polymer is deformed and the intended temporary shape is fixed. This process is often called programming. The programming process may consist of heating the sample, deforming, and cooling the sample, or drawing the sample at a low temperature. The permanent crosslinked shape is now stored while the sample shows the temporary shape. Heating the shape memory polymer above a transition temperature induces the shape memory effect providing internal forces urging the crosslinked polymer toward its permanent or crosslinked shape. Alternatively or in addition to the application of an external stimulus, it is possible to apply an internal stimulus (e.g., the passage of time) to achieve a similar, if not identical result.

A chemical crosslinked network may be formed by low doses of irradiation. Polyethylene chains are oriented upon the application of mechanical stress above the melting temperature of polyethylene crystallites, which can be in the range between 60° C. and 130° C. Materials that are most often used for the production of shape memory linear polymers by ionizing radiation include high density polyethylene, low density polyethylene and copolymers of polyethylene and poly(vinyl acetate). After shaping, for example, by extrusion or compression molding, the polymer is covalently crosslinked by means of ionizing radiation, for example, by highly accelerated electrons. The energy and dose of the radiation are adjusted to the geometry of the sample to reach a sufficiently high degree of crosslinking, and hence sufficient fixation of the permanent shape.

Another example of chemical crosslinking includes heating poly(vinyl chloride) under a vacuum resulting in the elimination of hydrogen chloride in a thermal dehydrocholorination reaction. The material can be subsequently crosslinked in an HCl atmosphere. The polymer network obtained shows a shape memory effect. Yet another example is crosslinked poly[ethylene-co-(vinyl acetate)] produced by treating the radical initiator dicumyl peroxide with linear poly[ethylene-co-(vinyl acetate)] in a thermally induced crosslinking process. Materials with different degrees of crosslinking are obtained depending on the initiator concentration, the crosslinking temperature and the curing time. Covalently crosslinked copolymers made form stearyl acrylate, methacrylate, and N,N'-methylenebisacrylamide as a crosslinker.

Additionally shape memory polymers include polyurethanes, polyurethanes with ionic or mesogenic components, block copolymers consisting of polyethyleneterephthalate and polyethyleneoxide, block copolymers containing polystyrene and poly(1,4-butadiene), and an ABA triblock copolymer made from poly(2-methyl-2-oxazoline) and a poly (tetrahydrofuran). Further examples include block copolymers made of polyethylene terephthalate and polyethylene oxide, block copolymers made of polystyrene and poly(1,4-butadiene) as well as ABA triblock copolymers made from poly(tetrahydrofuran) and poly(2-methyl-2-oxazoline). Other thermoplastic polymers which exhibit shape memory characteristics include polynorbornene, and polyethylene grated with nylon-6 that has been produced for example, in a reactive blending process of polyethylene with nylon-6 by adding maleic anhydride and dicumyl peroxide.

Figure 2:
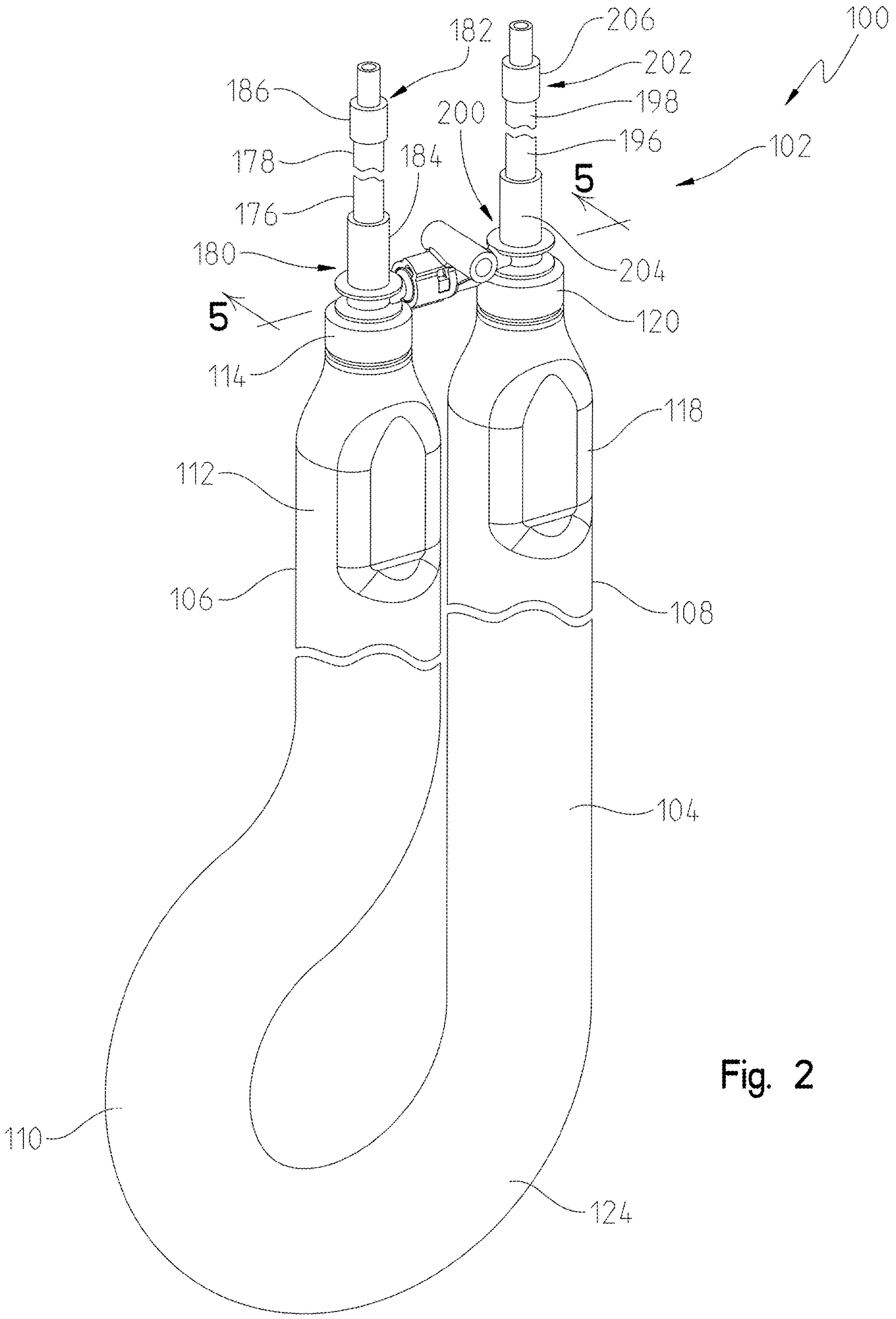
FIG. 2 is a perspective view of an illustrative fluid coupling of the present disclosure supported within an upper portion of a reservoir.
Figure 3:
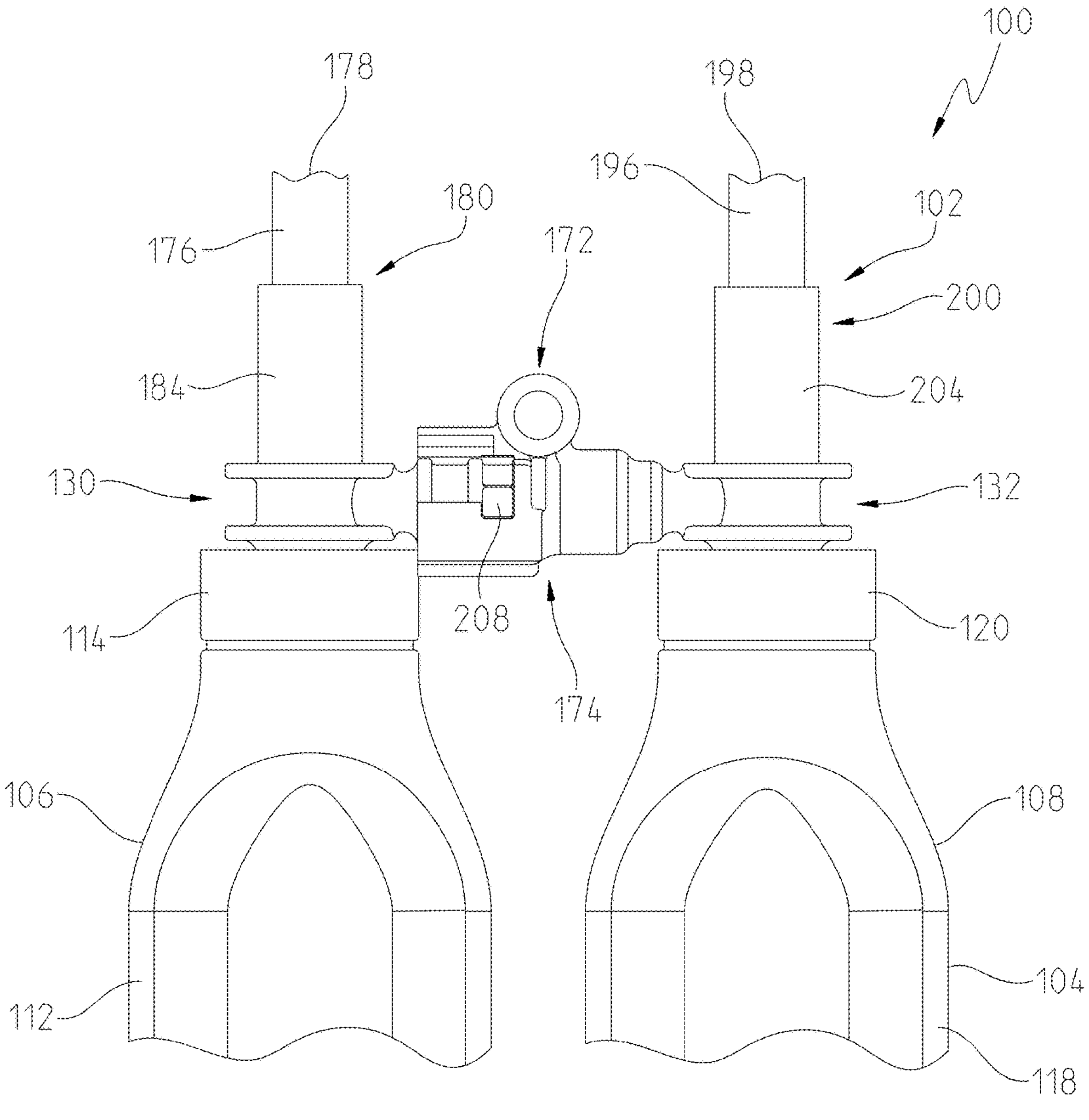
FIG. 3 is a side elevational view of the illustrative fluid coupling of FIG. 2.
Figure 4:
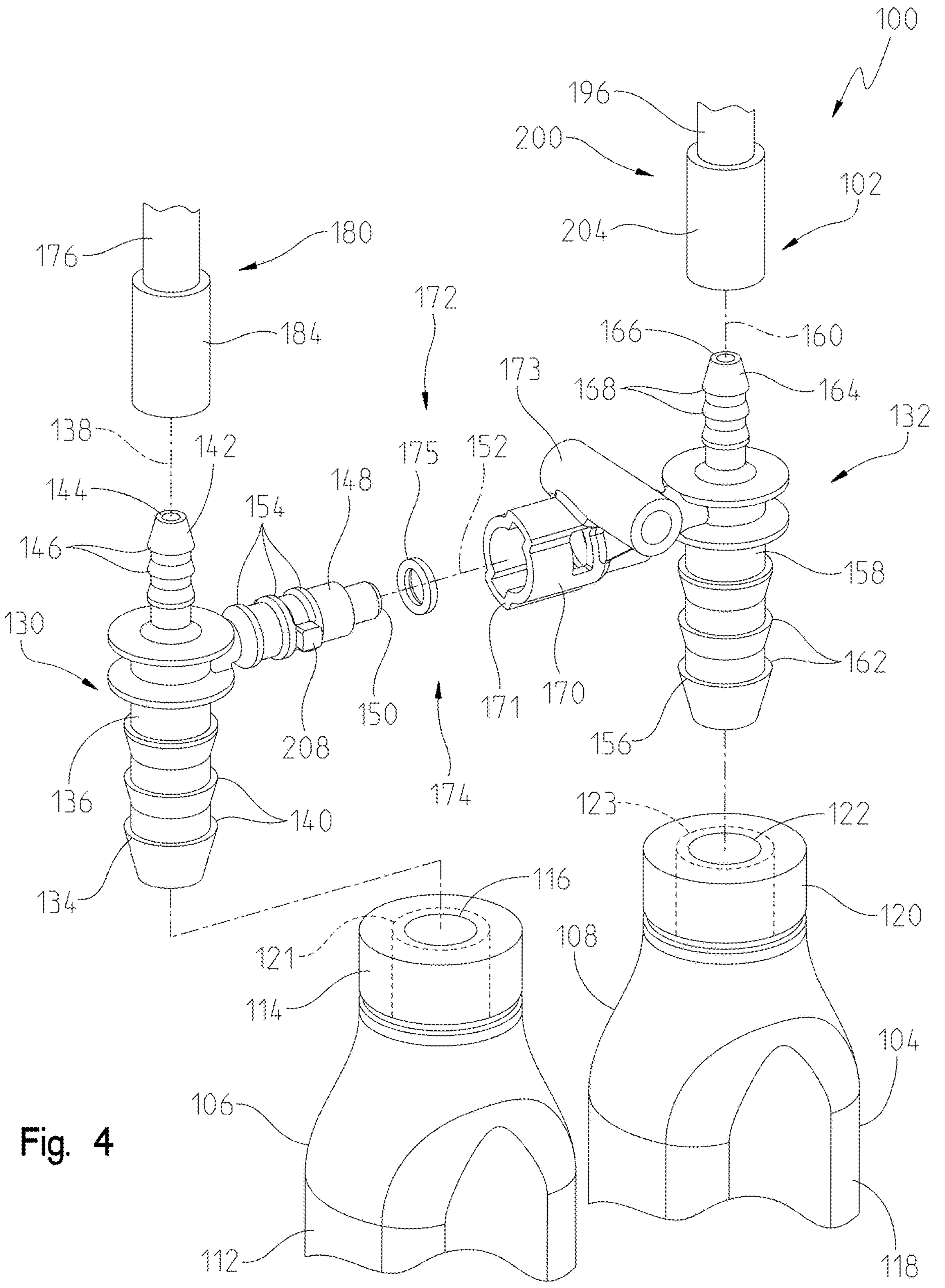
FIG. 4 is an exploded perspective view of the illustrative fluid coupling of FIG. 2.

Referring now to FIGS. 2-4, an illustrative fluid reservoir system 100 is shown as including to a fluid coupling 102 of the present disclosure. The illustrative reservoir system 100 includes a serpentine container or tank 104 including a first container portion 106, a second container portion 108, and a lower intermediate container portion 110 extending between, and below, the first and second container portions 106 and 108. The first container portion 106 includes a first side wall 112 having a first neck 114 defining a first opening 116. Similarly, the second container portion 108 includes a second side wall 118 having a second neck 120 defining a second opening 122.

In certain illustrative embodiments, the first neck 114 is formed integral with the first container portion 106, and the second neck 120 is formed integral with the second container portion 108. As such, the first and second side walls 112 and 118 define the first and second openings 116 and 122, respectively. In other illustrative embodiments, a first inset tube 121 may be received within the first neck 114, and a second inset tube 123 may be received within the second neck 120 (FIG. 4). More particularly, the first side wall 112 may be molded over the first inset tube 121 to define the first opening 116, and the second side wall 118 may be molded over the second inset tube 123 to define the second opening 122. The inset tubes 121 and 123 may help maintain a consistent inner diameter, circular cross-sectional shape and smooth inner surface.

Figure 5:
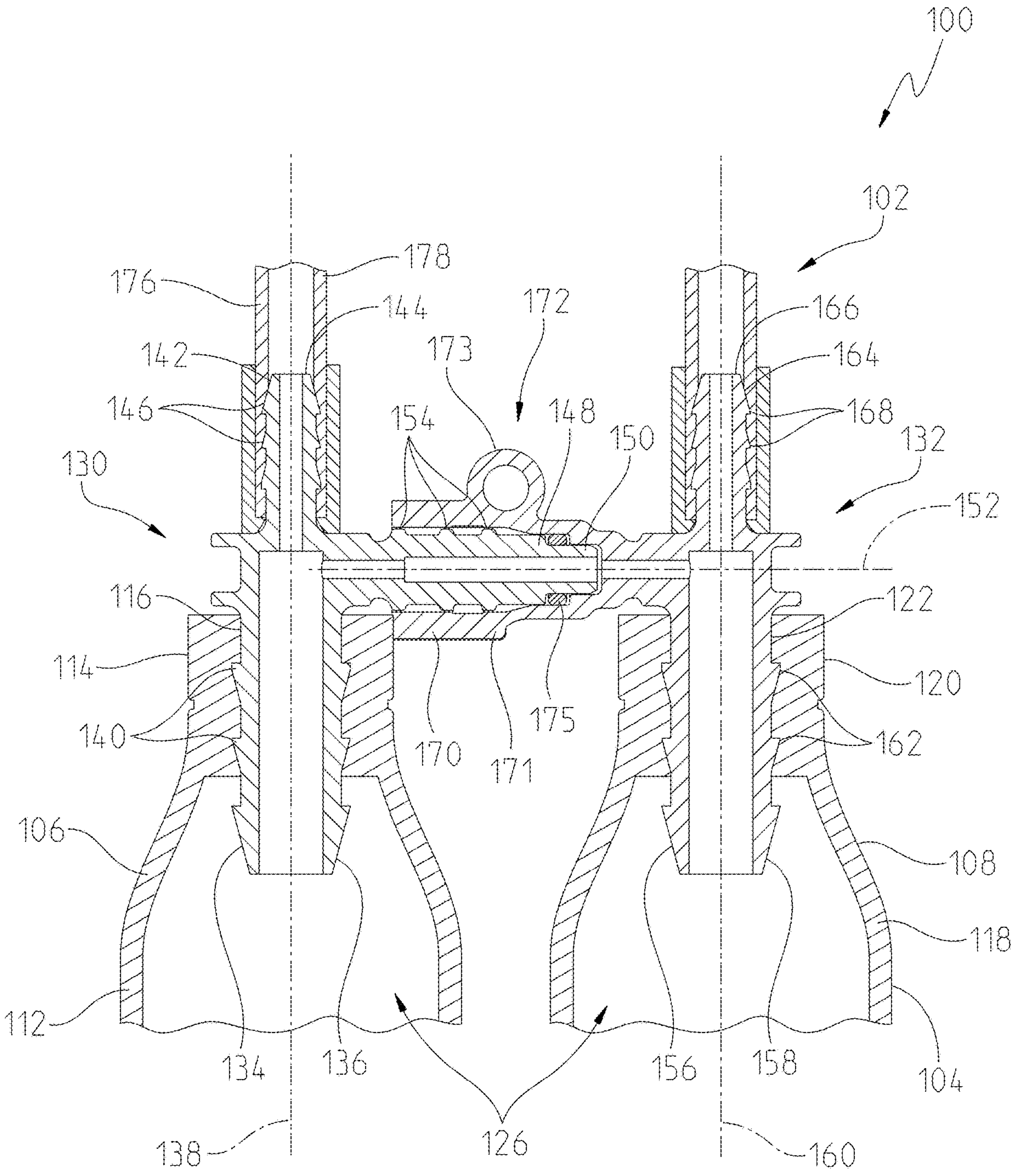
FIG. 5 is a cross-sectional view taken along line 5-5 of FIG. 2.

The intermediate container portion 110 also includes a side wall 124 operably coupled to the first and second side walls 112 and 118 to define a chamber 126 in fluid communication with the first and second openings 116 and 122 (FIG. 5). As further detailed herein, the tank 104 may be molded from a polymer, such as a polyethylene.

With reference to FIGS. 4 and 5, the illustrative fluid coupling 102 includes a first (e.g., male) fitting 130 releasably and fluidly coupled to a second (e.g., female) fitting 132. The first fitting 130 illustratively includes a longitudinally extending first projection 134 received within the first opening 116 of the first container portion 106. In the orientation shown in FIGS. 2-5, the first projection 134 extends downwardly. The first projection 134 illustratively includes a tubular member 136 defining a longitudinal axis 138 and having a plurality of outwardly extending barbs 140. The first projection 134 is received within the first opening 116 of the first container portion 106, wherein the barbs 140 engage with the first neck 114.

A longitudinally extending second projection 142 is illustratively axially aligned along the longitudinal axis 138 with the first projection 134 and is in fluid communication therewith. In the orientation shown in FIGS. 2-5, the second projection 142 extends upwardly. The second projection 142 illustratively includes a tubular member 144 including a plurality of outwardly extending barbs 146.

A transversely extending male connector 148 is illustratively in fluid communication with both the upwardly first and second projections 136 and 142. The male connector 148 illustratively includes a tubular member 150 defining a transverse axis 152 extending perpendicular to the longitudinal axis 138. Annular projections 154 may extend radially outwardly from the tubular member 150. As further detailed herein, the first fitting 130 is illustratively formed of a polymer, such as a polyethylene. However, the structure of the first fitting 130 facilitates the use of materials other than a polymer, such as metal.

The second fitting 132 illustratively includes a longitudinally extending first projection 156 received within the second opening 122 of the second container portion 108. In the orientation shown in FIGS. 2-5, the first projection 156 extends downwardly. The first projection 156 illustratively includes a tubular member 158 defining a longitudinal axis 160 and having a plurality of outwardly extending barbs 162. The first projection 156 is received within the second opening 122 of the second container portion 108, wherein the barbs 162 engage with the second neck 120.

A longitudinally extending second projection 164 is illustratively axially aligned along the longitudinal axis 160 with the first projection 156 and is in fluid communication therewith. In the orientation shown, the second projection 164 extends upwardly. The second projection 164 illustratively includes a tubular member 166 including a plurality of outwardly extending barbs 168.

A transversely extending female connector 170 is illustratively in fluid communication with both the first and second projections 156 and 164. The female connector 170 includes a side wall 171 and is releasably coupled with the male connector 148 to define a fluid coupler 172 providing fluid communication between the first fitting 130 and the second fitting 132. A cylindrical handle 173 is illustratively supported above the female connector 170 and is configured to facilitate manipulation of the second fitting 132 relative to the first fitting 130. An annular seal 175, illustratively formed of an elastomer, is illustratively received between the tubular member 150 and the side wall 171 to provide a fluid seal between the male connector 148 and the female connector 170.

As further detailed herein, the second fitting 132 is illustratively formed of a polymer, such as a polythelyne. However, the structure of the second fitting 132 facilitates the use of materials other than a polymer, such as metal. Illustratively, a retainer 174 releasably secures the male connector 148 with the female connector 170.

With further reference to FIGS. 2-5, a first tube 176 includes a side wall 178 extending between a proximal end 180 and a distal end 182. The first tube 176 is illustratively formed of a polymer, such as a polyethylene. The proximal end 180 of the first tube 176 is fluidly coupled to the first fitting 130 via the upwardly extending second projection 142. A first overmold 184 illustratively secures the proximal end 180 of the first tube 176 to the first fitting 130. Illustratively, the side wall 178 of the first tube 176 is captured between the barbs 140 and the overmold 184. More particularly, the first overmold 184 is formed on the outer surface of the first tube 176 and provide additional reinforcement (i.e., thicken the side wall) of the first tube 176.

As shown in FIG. 1, a fitting 186 is illustratively formed via overmolding on the distal end 182 of the first tube 176. The fitting 186 may be configured to fluidly couple to other components of the reservoir system 100 (e.g., additional tanks, valves, etc.). Illustratively, the fitting 186 is fully cross-linked.

Similarly, a second tube 196 includes a side wall 198 extending between a proximal end 200 and a distal end 202. The second tube 196 is illustratively formed of a polymer, such as a polyethylene. The proximal end 200 of the second tube 196 is fluidly coupled to the second fitting 132 via the upwardly extending second projection 164. A second overmold 204 illustratively secures the proximal end 198 of the second tube 196 to the second fitting 132. Illustratively, the side wall 198 of the second tube 196 is captured between the barbs 162 and the overmold 204. More particularly, the second overmold 204 is formed on the outer surface of the second tube 196 and provide additional reinforcement (i.e., thicken the side wall) of the second tube 196.

As detailed above, the first overmold 184 cooperates with the barbs 146 of the projection 142 to couple the first tube 176 to the first fitting 130, and the second overmold 204 cooperates with the barbs 168 of the projection 164 to couple with the second tube 196 to the second fitting 132. In other illustrative embodiments, different couplers may be substituted for the cooperating overmolds 184, 204 and barbs 146, 168. For example, an illustrative quick-connect fitting is detailed in U.S. Patent Application Publication No. 2022/0333723 to Gardner et al., the disclosure of which is expressly incorporated herein by reference.

As shown in FIG. 2, a fitting 206 is illustratively formed via overmolding on the distal end 202 of the second tube 196. The fitting 206 may be configured to fluidly couple to other components of the reservoir system 100 (e.g., additional tanks, valves, etc.). Illustratively, the fitting 206 is fully cross-linked.

The fluid coupler 172 includes the first (e.g., male) connector 148 and the second (e.g., female) connector 170. The coupler 172 mechanically and fluidly couples together the male and female connectors 148 and 170.

Figure 7:
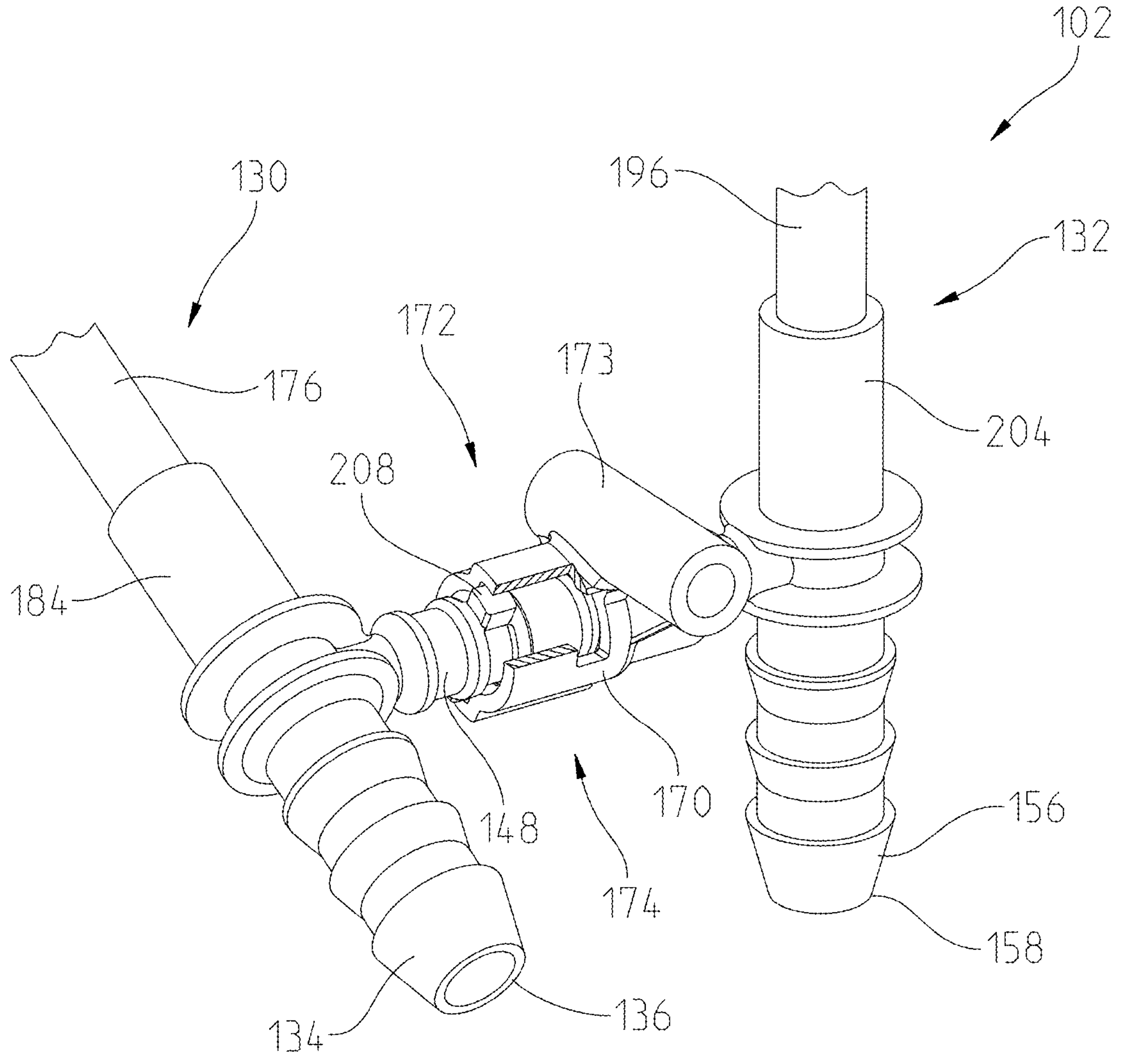
FIG. 7 is a detailed perspective view similar to FIG. 6, showing the male component partially received within the female component.
Figure 8:
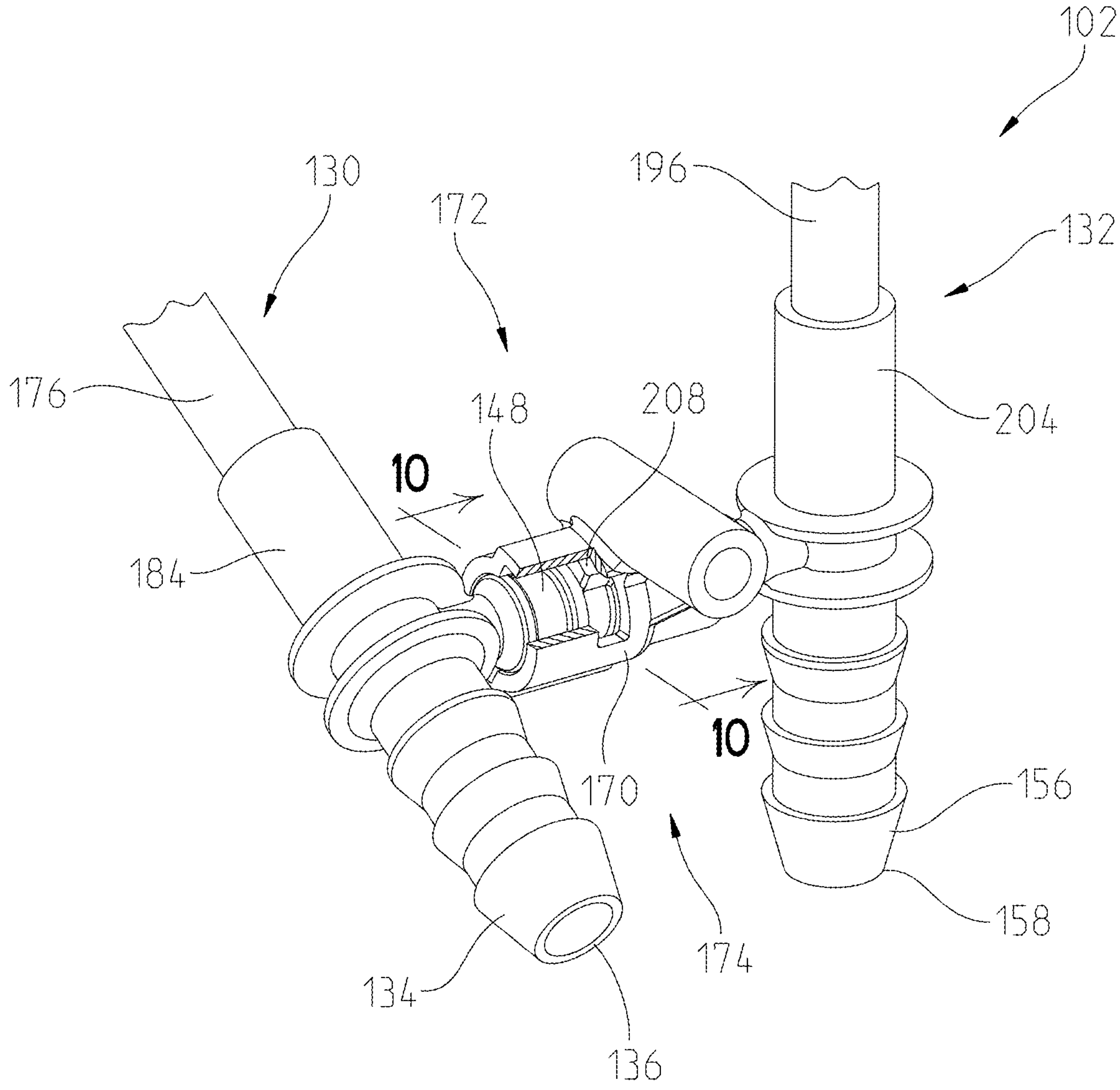
FIG. 8 is a detailed perspective view similar to FIG. 7, showing the male component fully received within the female component in an unlocked mode.
Figure 9:
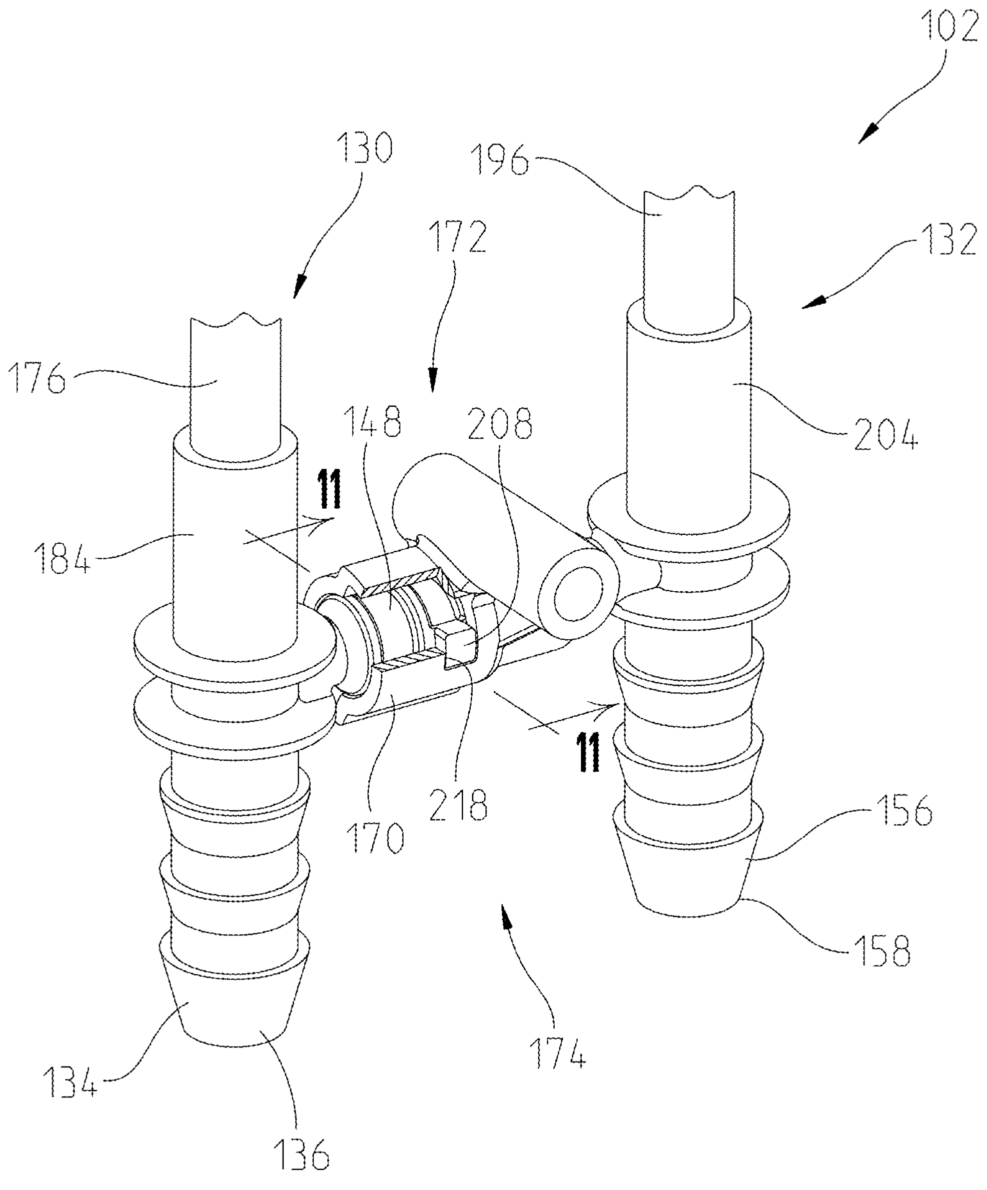
FIG. 9 is a detailed perspective view similar to FIG. 8, showing the male component fully received within the female component in a locked mode.
Figure 10:
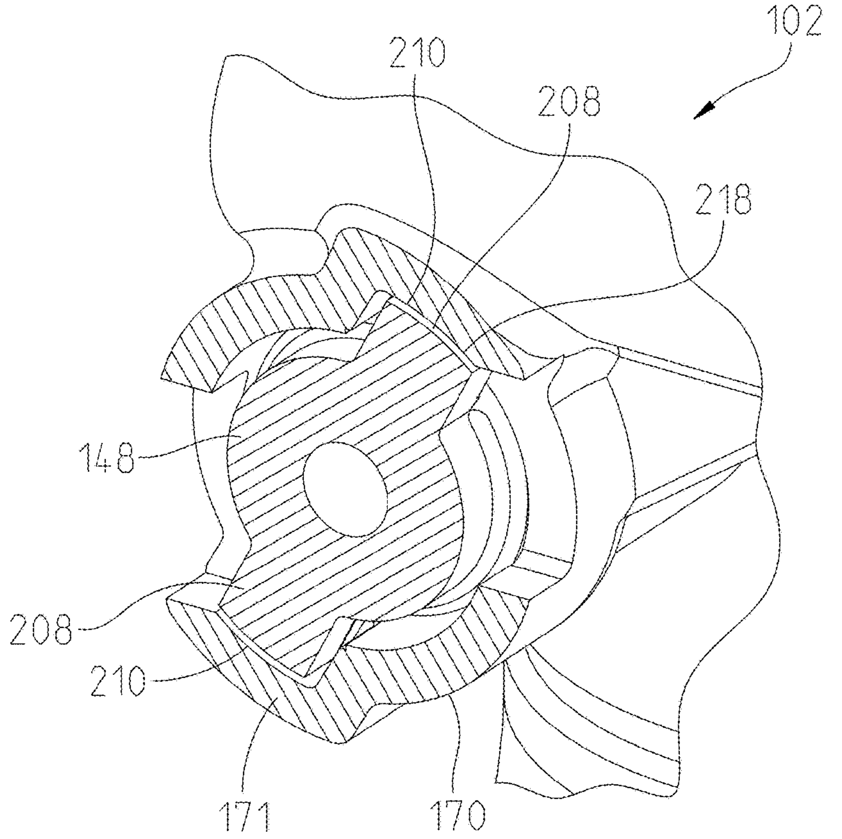
FIG. 10 is a cross-sectional view taken along line 10-10 of FIG. 8, showing the male component fully received within the female component in the unlocked mode of FIG. 8.
Figure 11:
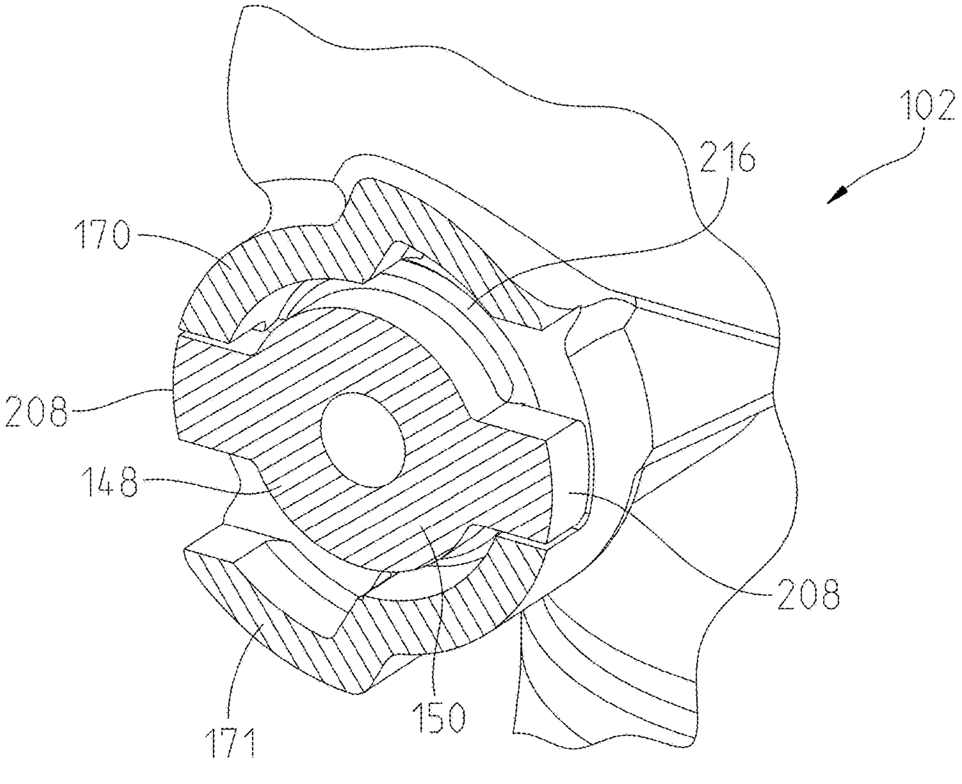
FIG. 11 is a cross-sectional view similar to FIG. 10, showing the male component fully received within the female component in the locked mode of FIG. 9.

With reference to FIGS. 6-11, the fluid connector 172 illustratively includes the retainer 174 in the form of a quarter turn fitting similar to a bayonet style coupling. The retainer 174 is movable between an unlocked mode (FIGS. 8 and 10) and a locked mode (FIGS. 9 and 11).

The illustrative retainer 174 includes diametrically opposed protrusions or locking tabs 208 supported by the male connector 148 and extending radially outwardly therefrom. The locking tabs 208 are slidably received within axial slots 210 formed within an inner surface of the female connector 170. A proximal end 212 of each slot 210 is open, while a distal end 214 of each slot 210 is connected to an arcuate locking slot 216. A retaining lip 218 is configured to engage the tabs 208 for axially securing the male connector 148 with the female connector 170.

For higher pressure applications, multiple connectors 148 and 170, and cooperating annular seals 175 may be utilized.

Figure 6:
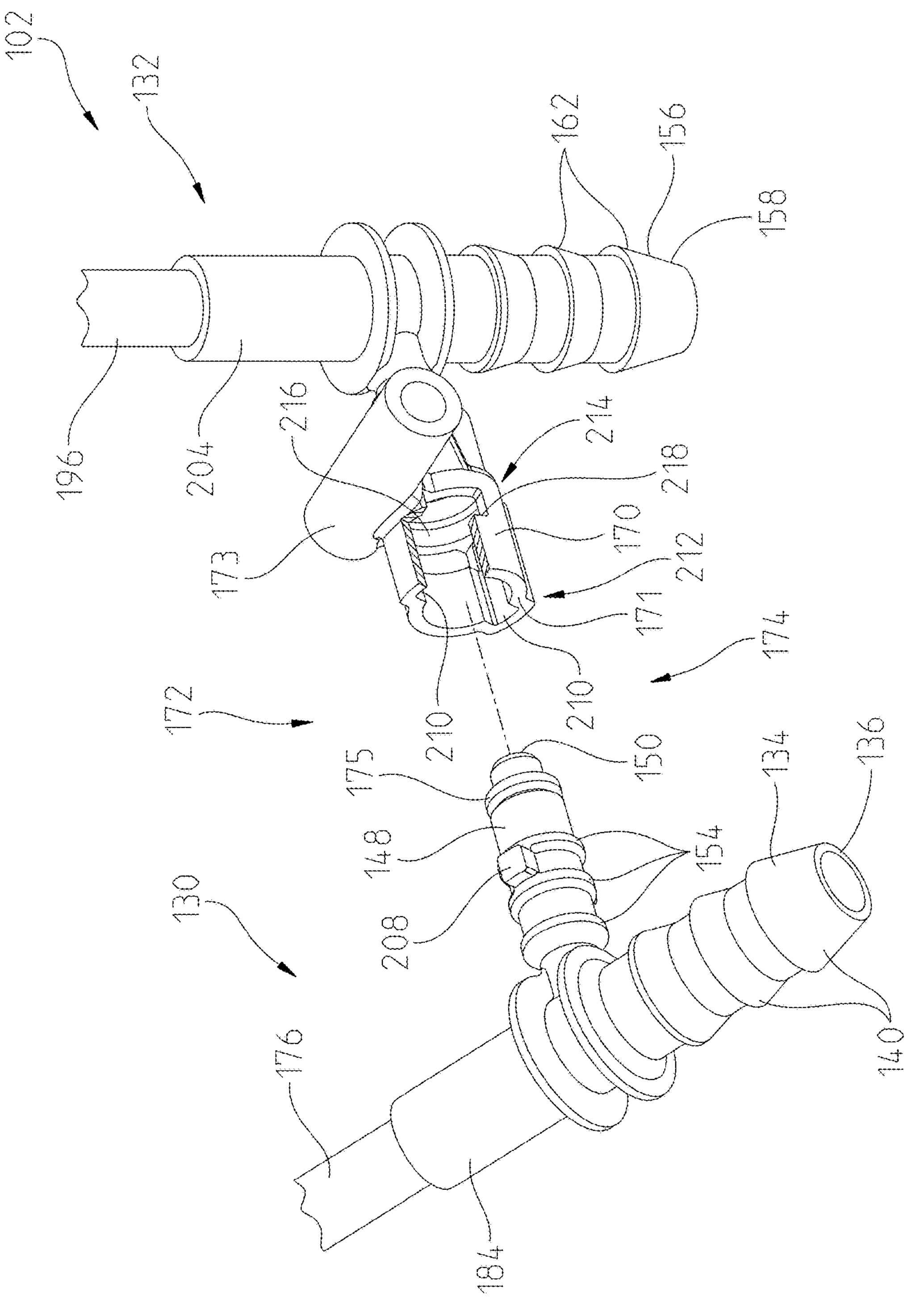
FIG. 6 is a detailed exploded perspective view of the connection between a male component and a female component of the fluid coupling of FIG. 2.

During assembly of the coupling 102, the first (e.g., male) fitting 130 is rotationally offset by approximately 90 degrees from the second (e.g., female) fitting 132, as shown in FIG. 6. The male connector 148 is then inserted into the female connector 170 wherein the locking tabs 208 are inserted into the slots 210, as shown in FIG. 7. With reference to FIG. 8, the male connector 148 is then axially moved into the female connector 170 such that the locking tabs 208 slide within the slots 210. Next, the male connector 148 is rotated by approximately 90 degrees relative to the female connector 170 such that the tabs 208 rotate within the locking slots 210 from the unlocked position (FIGS. 8 and 10) into the locked position (FIGS. 9 and 11). In the locked position as shown in FIG. 9, the locking tabs 208 engage with the retaining lip 218 to axially retain the male connector 148 within the female connector 170, thereby securing the first fitting 130 to the second fitting 132 and defining the fluid coupling 102.

The reservoir system 100 provides for more efficient full crosslinking of the connecting tubes and the respective overmolds. The tanks may be crosslinked more efficiently since they do not have tube assemblies attached and taking up space and entangling themselves.

Although the invention has been described in detail with reference to certain preferred embodiments, variations and modifications exist within the spirit and scope of the invention as described and defined in the following claims.

What is claimed is:

1. A reservoir system comprising:

a first container portion including a first side wall having a first neck defining a first opening;

a second container portion including a second side wall having a second neck defining a second opening;

a first fitting including a longitudinally extending first barbed projection received within the first opening of the first container portion, and a transversely extending male connector in fluid communication with the first barbed projection;

a first tube including a proximal end and a distal end, the first tube fluidly coupled to the first fitting;

a first overmold securing the proximal end of the first tube to the first fitting;

a second fitting including a longitudinally extending second barbed projection received within the second opening of the second container portion, and a transversely extending female connector in fluid communication with the second barbed projection, the male connector received within the female connector to fluidly couple the first fitting with the second fitting;

a releasable retainer extending between the male connector and the female connector;

a second tube including a proximal end and a distal end, the second tube fluidly coupled to the second fitting; and a second overmold securing the proximal end of the second tube to the second fitting.

2. The reservoir system of claim 1, wherein:

the first container portion is an upper portion of a first container; and the second container portion is an upper portion of a second container positioned in spaced relation to the first container.

3. The reservoir system of claim 1, wherein a single container defines the first container portion and the second container portion.

4. The reservoir system of claim 1, further comprising a sealing ring positioned between the male connector and the female connector.

5. The reservoir system of claim 1, further comprising a fluid coupler overmolded around a distal end of the first tube.

6. The reservoir system of claim 1, wherein:

the first overmold comprises a first collar concentrically received around the proximal end of the first tube; and the second overmold comprises a second collar concentrically received around the proximal end of the second tube.

7. The reservoir system of claim 6, wherein:

the first fitting further includes a longitudinally extending first upper projection in fluid communication with the first barbed projection;

the first tube is captured between the upper projection and the first collar;

the second fitting further includes a longitudinally extending second upper projection in fluid communication with the second barbed projection; and the second tube is captured between the upper projection and the second collar.

8. The reservoir system of claim 1, wherein the releasable retainer comprises a bayonet coupling.

9. The reservoir system of claim 1, wherein the first fitting and the second fitting are formed of a polymer.

10. The reservoir system of claim 9, wherein the polymer of the first fitting and the second fitting are formed of a cross-linked polyethylene.

11. The reservoir system of claim 1, wherein:

the first neck includes a first inset tube defining the first opening; and the second neck includes a second inset tube defining the second opening.

12. A reservoir system comprising:

a first container portion including a first side wall having a first neck defining a first opening;

a second container portion including a second side wall having a second neck defining a second opening;

a first fitting including a longitudinally extending lower projection received within the first opening of the first container portion, a longitudinally extending upper projection in fluid communication with the lower projection, and a transversely extending male connector in fluid communication with the lower projection and the upper projection;

a first tube including a proximal end and a distal end, the first tube fluidly coupled to the first fitting;

a first overmold securing the proximal end of the first tube to the upper projection of the first fitting;

a second fitting including a longitudinally extending lower projection received within the second opening of the second container portion, a longitudinally extending upper projection in fluid communication with the lower projection, and a transversely extending female connector in fluid communication with the lower projection and the upper projection, the male connector received within the female connector to fluidly couple the first fitting with the second fitting;

a second tube including a proximal end and a distal end, the second tube fluidly coupled to the second fitting;

a second overmold securing the proximal end of the second tube to the upper projection of the second fitting; and a releasable retainer extending between the male connector and the female connector.

13. The reservoir system of claim 12, wherein the lower projection of the first fitting is a tubular projection including outwardly extending barbs, and the lower projection of the second fitting is a tubular projection including outwardly extending barbs.

14. The reservoir system of claim 13, wherein the upper projection of the first fitting is a tubular projection including outwardly extending barbs, and the upper projection of the second fitting is a tubular projection including outwardly extending barbs.

15. The reservoir system of claim 12, wherein:

the first container portion is an upper portion of a first container; and the second container portion is an upper portion of a second container positioned in spaced relation to the first container.

16. The reservoir system of claim 12, wherein a single container defines the first container portion and the second container portion.

17. The reservoir system of claim 12, further comprising a sealing ring positioned between the male connector and the female connector.

18. The reservoir system of claim 12, further comprising a fluid coupler overmolded around a distal end of the first tube.

19. The reservoir system of claim 12, wherein:

the first overmold comprises a first collar concentrically received around the proximal end of the first tube; and the second overmold comprises a second collar concentrically received around the proximal end of the second tube.

20. The reservoir system of claim 19, wherein:

the first tube is captured between the upper projection and the first collar; and the second tube is captured between the upper projection and the second collar.

21. The reservoir system of claim 12, wherein the releasable retainer comprises a bayonet coupling.

22. The reservoir system of claim 12, wherein the first fitting and the second fitting are formed of a polymer.

23. The reservoir system of claim 22, wherein the polymer of the first fitting and the second fitting are formed of a cross-linked polyethylene.

24. The reservoir system of claim 12, wherein:

the first neck includes a first inset tube defining the first opening; and the second neck includes a second inset tube defining the second opening.

25. A fluid coupling for a reservoir system, the fluid coupler comprising:

a first fitting including a longitudinally extending lower projection, a longitudinally extending upper projection, and a transversely extending male connector in fluid communication with the lower projection and the upper projection;

wherein the lower projection of the first fitting is a tubular projection including outwardly extending barbs;

a second fitting including a longitudinally extending lower projection, a longitudinally extending upper projection, and a transversely extending female connector in fluid communication with the lower projection and the upper projection, the male connector received within the female connector to fluidly couple the first fitting with the second fitting;

wherein the lower projection of the second fitting is a tubular projection including outwardly extending barbs; and a releasable retainer extending between the male connector and the female connector.

26. The fluid coupling of claim 25, wherein the upper projection of the first fitting is a tubular projection including outwardly extending barbs, and the upper projection of the second fitting is a tubular projection including outwardly extending barbs.

27. The fluid coupling of claim 25, further comprising:

a first tube including a proximal end and a distal end, the first tube fluidly coupled to the first fitting;

a first overmold securing the proximal end of the first tube to upper projection of the first fitting;

a second tube including a proximal end and a distal end, the second tube fluidly coupled to the second fitting; and a second overmold securing the proximal end of the second tube to the upper projection of the second fitting.

28. The fluid coupling of claim 25, further comprising a sealing ring positioned between the male connector and the female connector.

29. The fluid coupling of claim 25, further comprising a fluid coupler overmolded around a distal end of the first tube.

30. The fluid coupling of claim 25, wherein:

the first overmold comprises a first collar concentrically received around the proximal end of the first tube;

the first tube is captured between the upper projection and the first collar;

the second overmold comprises a second collar concentrically received around the proximal end of the second tube; and the second tube is captured between the upper projection and the second collar.

31. The fluid coupling of claim 25, wherein the releasable retainer comprises a bayonet coupling.

32. The fluid coupling of claim 25, wherein the first fitting and the second fitting are formed of a polymer.

33. The fluid coupling of claim 32, wherein the polymer of the first fitting and the second fitting are formed of a cross-linked polyethylene.

* * * * *